May 15, 1934.    C. CHRISTIANSEN    1,958,910
HAY CRUSHING MACHINE
Original Filed Jan. 26, 1931    3 Sheets-Sheet 2
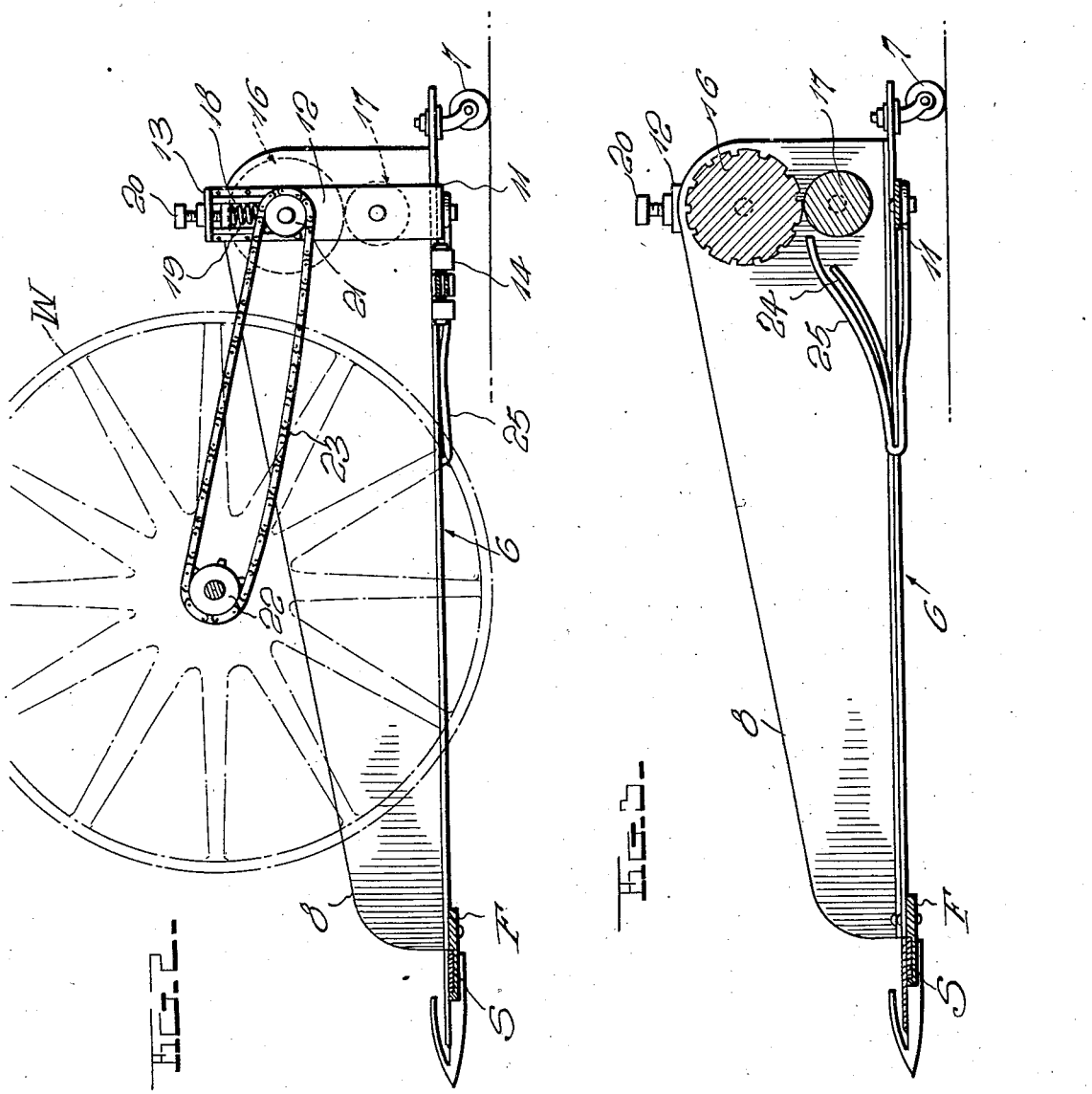
Inventor
Christian Christiansen
Witness
H. Woodard
By H. B. Willson &co
Attorneys.

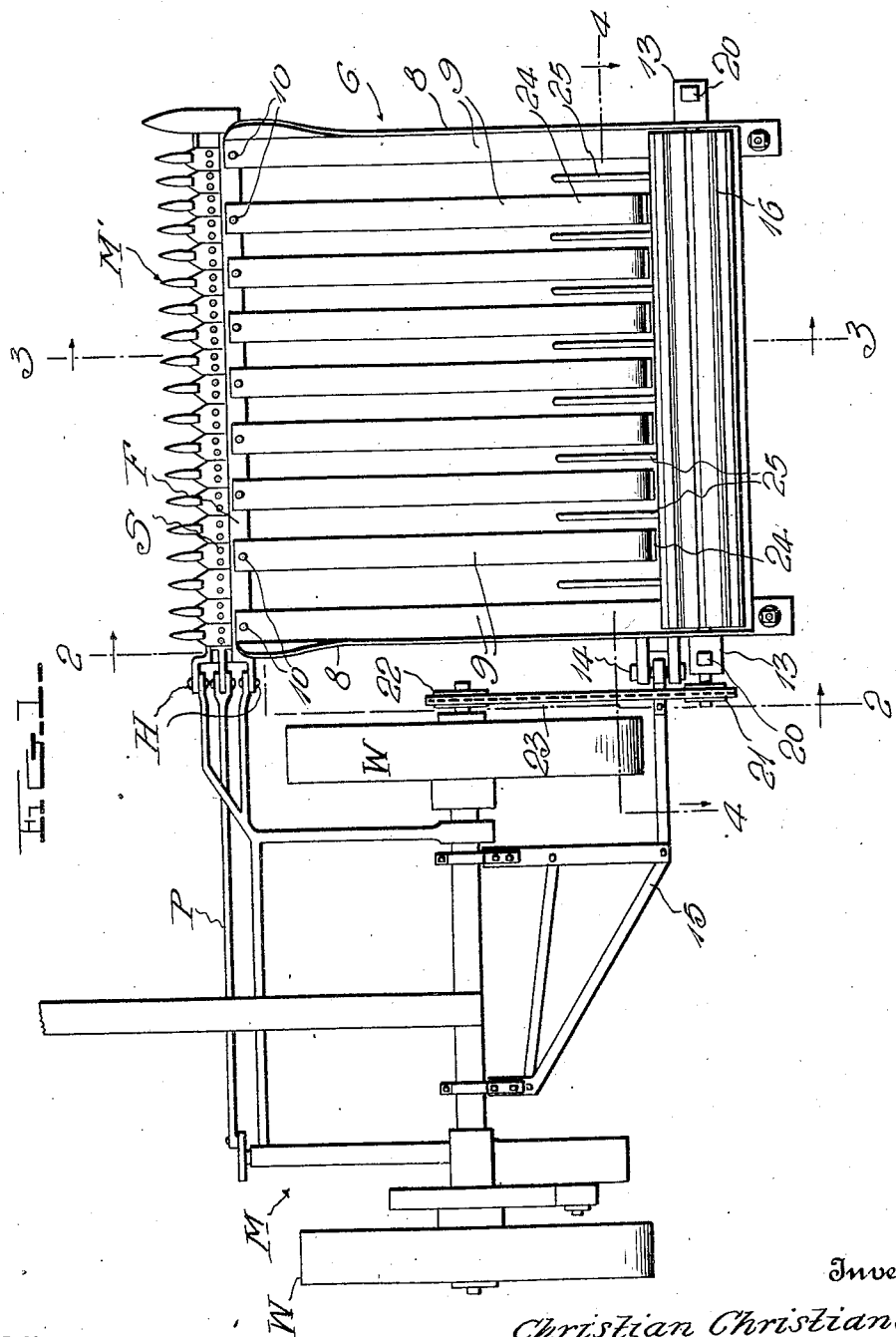

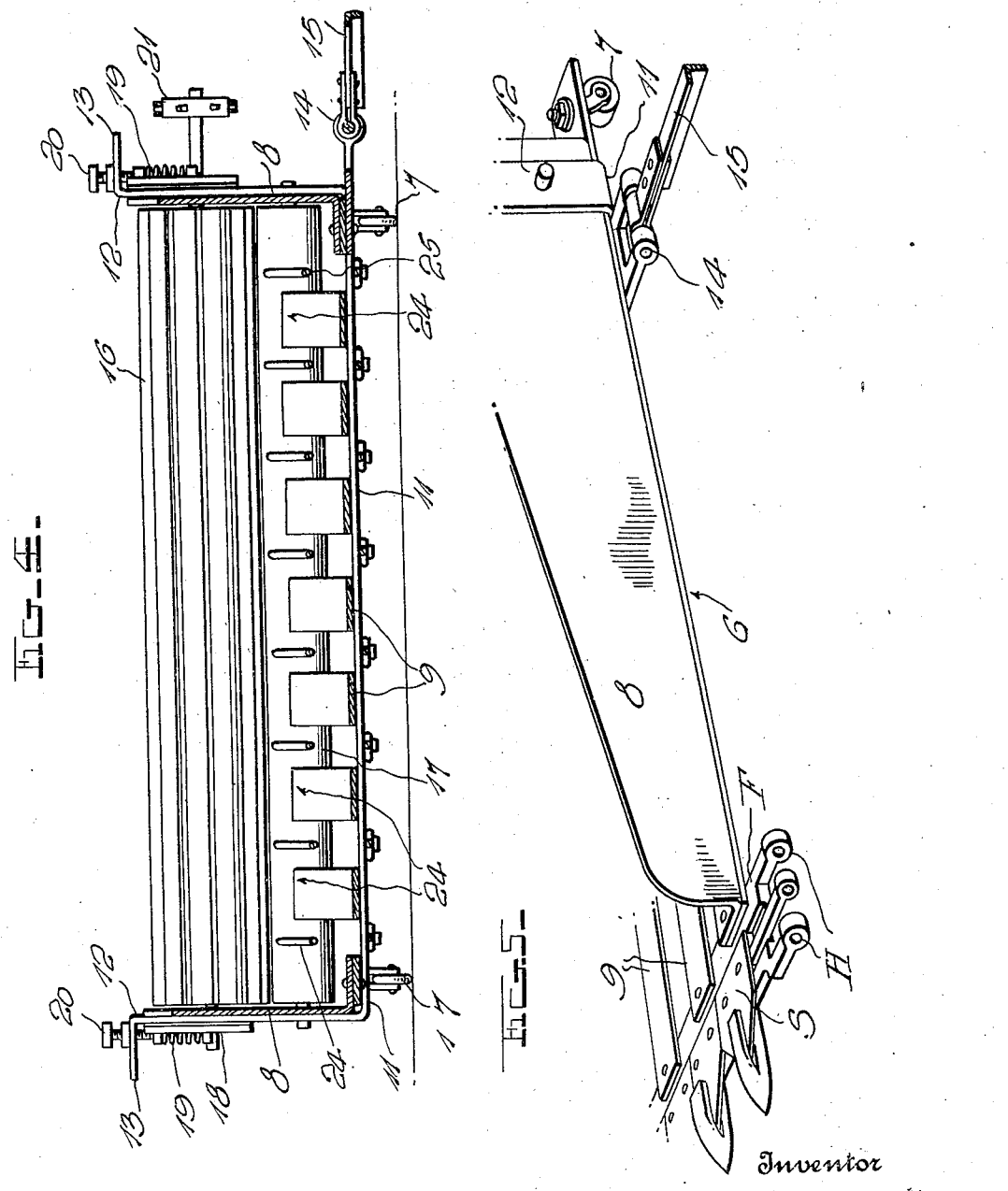

Patented May 15, 1934

1,958,910

UNITED STATES PATENT OFFICE 1,958,910

HAY CRUSHING MACHINE

Christian Christiansen, Fargo, N. Dak.

Application January 26, 1931, Serial No. 511,364
Renewed July 25, 1933

4 Claims. (Cl. 56—1)

When following the conventional method of curing hay, the mown hay is left upon the ground until it has become sufficiently dry for stacking, either in the field or elsewhere. This possesses the drawback however, of producing excessive drying of the leaves and small portions of the hay, before the stems have dried sufficiently to permit safe stacking. It is the object of my invention however, to provide a unique hay crushing machine by the use of which I greatly facilitate drying of the hay and hence am enabled to stack the crop before the leaves and fine fibres have become excessively dried and "crumbly".

With the foregoing in view, the invention resides in the novel subject matter hereinafter described and claimed, description being accomplished by reference to the accompanying drawings.

Fig. 1 is a top plan view of a machine constructed in accordance with the invention.

Figs. 2 and 3 are sectional views on lines 2—2 and 3—3 of Fig. 1.

Fig. 4 is a sectional view at right angles to Figs. 2 and 3, cut on line 4—4 of Fig. 1.

Fig. 5 is a fragmentary perspective view.

In constructing the machine, I make use of a conventional mowing machine M having the usual laterally projecting hay-mowing mechanism M', which consists of a finger bar F and a sickle bar S, the former being hinged at H for vertical swinging and the latter being pivoted to the usual pitman P. One of the wheels W of the mower is preferably employed for driving the crushing means, as hereinafter explained.

A frame structure 6 is suitably secured to the finger bar F and projects rearwardly therefrom, the rear end of said frame being preferably provided with casters 7 or with skids. In the present showing, the frame 6 embodies two parallel side wings 8 and a plurality of slats 9 extending longitudinally between said side wings, the front ends of the wings and slats being secured to the finger bar F by bolts or the like 10. Under the rear ends of the slats 9, I have shown a transverse bar 11 to which said slats are secured, the ends of said bar being turned upwardly at 12, providing bracing standards for the wings 8. The upper extremities of these standards are turned outwardly to provide ears 13 for a purpose to appear. The rear end portion of the frame 6 is connected by a hinge 14, with an appropriate rigid frame 15 which is secured to the frame of the mower M. The hinge 14 is in line with the hinge means H and hence the entire frame 6 and the crushing means thereon may vertically swing with the cutting mechanism M' when the latter is raised and lowered about the hinges H. The raising and lowering means for this mechanism M' may be of any suitable or well known type and is not illustrated forming no part of the present invention.

Extending transversely between the rear ends of the wings 8, are upper and lower crushing rollers 16 and 17 which may be journaled in bearings carried by the standards 12. The bearings for the upper roller 16 are preferably mounted in slots or guides 18 for vertical movement and are urged constantly downward by springs 19 which may be tensioned by screws 20 threaded through the ears 13.

A driving sprocket 21 is provided for the upper roller 16, another sprocket 22 is secured to one of the mower wheels, W, and a chain 23 is trained around these sprockets, thereby driving the upper roller 16. This chain is normally declined rearwardly as shown in Fig. 2 and hence it will not interfere with upward and inward swinging of the frame 6 to a limited extent.

To guide the hay from the slats 9 between the rollers 16 and 17, the rear ends of said slats are curved upwardly as shown at 24, and guide fingers 25 are provided between said slats, said fingers being secured to the transverse bar 11.

As the mower advances and mows the hay, the latter is received upon the slats 9, between the side wings 8, with the result that it is directed between the crushing rollers 16 and 17. These rollers crush and hence remove a great deal of juice from the hay. The crushed hay is then immediately deposited upon the field and left to dry, and due to removal of the juice, drying of the stems will occur almost as quickly as drying of the leaves and fine fibrous portions of the hay. Moreover, crushing of the stems renders the hay more easily edible and more palatable.

While the present disclosure illustrates one form of machine which may be used, it is to be understood that the invention is not restricted to this specific disclosure.

I claim:—

1. In combination with a conventional mowing machine having a laterally projecting mowing mechanism hinged for upward swinging and embodying a finger bar and a sickle bar; a frame connected with said finger bar and adapted to be swung vertically therewith, means mounted on said frame for receiving and crushing the mown hay, and means for driving said crushing means.

2. In combination with a conventional mowing machine having a laterally projecting mowing mechanism hinged for upward swinging and embodying a finger bar and a sickle bar; a frame secured to and projecting rearwardly from said finger bar, a rigid frame secured to the mower frame, a hinge connecting the first named frame with said rigid frame and alined with the hinge of said finger bar, whereby said first named frame may be vertically swung with said mowing mechanism, means mounted on said frame for receiving and crushing the mown hay, and driving means for said crushing means.

3. In combination with a conventional mowing machine having a laterally projecting mowing mechanism hinged for upward swinging and embodying a finger bar and a sickle bar; a frame secured to and projecting rearwardly from said finger bar, a rigid frame secured to the mower frame, a hinge connecting the first named frame with said rigid frame and alined with the hinge of said finger bar, whereby said first named frame may be vertically swung with said mowing mechanism, means mounted on said frame for receiving and crushing the mown hay, and means driven by a driven part of the mowing machine for driving said crushing means.

4. In combination with a conventional mowing machine having a laterally projecting mowing mechanism hinged for upward swinging and embodying a finger bar and a sickle bar; a frame secured to and projecting rearwardly from said finger bar, a rigid frame secured to the mower frame, a hinge connecting the first named frame with said rigid frame and alined with the hinge of said finger bar, whereby said first named frame may be vertically swung with said mowing mechanism, means mounted on said frame for receiving and crushing the mown hay, a driving sprocket for said crushing means, a second sprocket secured to a wheel of the mowing machine, and a chain trained around both of said sprockets.

CHRISTIAN CHRISTIANSEN.